United States Patent
Gomila et al.

(10) Patent No.: US 10,715,834 B2
(45) Date of Patent: Jul. 14, 2020

(54) FILM GRAIN SIMULATION BASED ON PRE-COMPUTED TRANSFORM COEFFICIENTS

(71) Applicant: InterDigital VC Holdings, Inc., Wilmington, DE (US)

(72) Inventors: Cristina Gomila, Cesson-Sevigne (FR); Joan Llach, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 110 days.

(21) Appl. No.: 14/870,484

(22) Filed: Sep. 30, 2015

(65) Prior Publication Data
US 2016/0021399 A1    Jan. 21, 2016

Related U.S. Application Data

(63) Continuation of application No. 11/667,581, filed on May 10, 2007, now Pat. No. 9,177,364.

(51) Int. Cl.
*H04N 19/46*    (2014.01)
*H04N 19/85*    (2014.01)
(Continued)

(52) U.S. Cl.
CPC .......... *H04N 19/85* (2014.11); *H04N 19/117* (2014.11); *H04N 19/136* (2014.11); *H04N 19/18* (2014.11);
(Continued)

(58) Field of Classification Search
CPC .................................................. H04N 19/117
See application file for complete search history.

(56) References Cited

U.S. PATENT DOCUMENTS

| 4,897,775 A | 1/1990 | Kaassens |
| 4,935,816 A | 6/1990 | Faber |

(Continued)

FOREIGN PATENT DOCUMENTS

| EP | 364285 | 10/1989 |
| EP | 363715 | 4/1990 |

(Continued)

OTHER PUBLICATIONS

Wiegand et al: "Overview of the H.264/AVC Video Coding Standard"; IEEE Transactions on Circuits and Systems for Video Technology, vol. 13, No. 7, Jul. 2003.

(Continued)

*Primary Examiner* — Josnel Jeudy
(74) *Attorney, Agent, or Firm* — Brian J. Dorini, Esquire; Robert D. Shedd, Esquire (57) ABSTRACT

Film grain simulation within a receiver (11) occurs by first obtaining at least one block of pre-computed transformed coefficients. The block of pre-computed transformed coefficients undergoes filtering responsive to a frequency range that characterizes a desired pattern of the film grain. In practice, the frequency range lies within a set of cut frequencies $f_{HL}$, $f_{VL}$, $f_{HH}$ and $f_{VH}$ of a filter in two dimensions that characterizes a desired film grain pattern. Thereafter, the filtered set of coefficients undergoes an inverse transform to yield the film grain pattern.

10 Claims, 3 Drawing Sheets

(51) Int. Cl.
*H04N 19/117* (2014.01)
*H04N 19/136* (2014.01)
*H04N 19/18* (2014.01)
*H04N 19/80* (2014.01)
*H04N 19/44* (2014.01)
*H04N 19/48* (2014.01)

(52) U.S. Cl.
CPC .............. *H04N 19/46* (2014.11); *H04N 19/44* (2014.11); *H04N 19/48* (2014.11); *H04N 19/80* (2014.11)

(56) References Cited

U.S. PATENT DOCUMENTS

| | | |
|---|---|---|
| 4,998,167 A | 3/1991 | Jaqua |
| 5,028,280 A | 7/1991 | Ihara et al. |
| 5,140,414 A | 8/1992 | Mowry |
| 5,216,556 A | 6/1993 | Steinberg et al. |
| 5,262,248 A | 11/1993 | Ihara et al. |
| 5,285,402 A | 2/1994 | Keith |
| 5,335,013 A | 8/1994 | Faber |
| 5,374,954 A | 12/1994 | Mowry |
| 5,406,326 A | 4/1995 | Mowry |
| 5,453,840 A | 9/1995 | Parker et al. |
| 5,457,491 A | 10/1995 | Mowry |
| 5,461,596 A | 10/1995 | Barrett |
| 5,471,572 A | 11/1995 | Buchner et al. |
| 5,475,425 A | 12/1995 | Przyborski et al. |
| 5,526,446 A | 6/1996 | Adelson et al. |
| 5,550,815 A | 8/1996 | Cloonan et al. |
| 5,629,769 A | 5/1997 | Cookingham et al. |
| 5,636,295 A * | 6/1997 | Kim ................... H04N 5/21 348/E5.077 |
| 5,641,596 A | 6/1997 | Gray et al. |
| 5,659,332 A | 8/1997 | Rybczynski |
| 5,687,011 A | 11/1997 | Mowry |
| 5,706,361 A | 1/1998 | Kent et al. |
| 5,709,972 A | 1/1998 | Cookingham et al. |
| 5,715,008 A | 2/1998 | Sekiguchi et al. |
| 5,742,892 A | 4/1998 | Chaddha |
| 5,767,860 A | 6/1998 | Zimmer et al. |
| 5,805,782 A | 9/1998 | Foran |
| 5,817,447 A | 10/1998 | Yip |
| 5,831,673 A | 11/1998 | Przyborski et al. |
| 5,832,172 A | 11/1998 | Jeon |
| 5,845,017 A | 12/1998 | Keyes |
| 5,917,609 A | 6/1999 | Breeuwer et al. |
| 6,067,125 A | 5/2000 | May |
| 6,134,200 A | 10/2000 | Timmermans |
| 6,216,838 B1 | 4/2001 | Bacher et al. |
| 6,219,838 B1 | 4/2001 | Cherichetti et al. |
| 6,233,647 B1 | 5/2001 | Bentz et al. |
| 6,266,817 B1 | 7/2001 | Chaddha |
| 6,269,180 B1 | 7/2001 | Sevigny |
| 6,285,711 B1 | 9/2001 | Ratakonda et al. |
| 6,327,304 B1 | 12/2001 | Miller et al. |
| 6,327,391 B1 | 12/2001 | Ohnishi et al. |
| 6,370,192 B1 | 4/2002 | Pearlstein et al. |
| 6,370,197 B1 | 4/2002 | Pearlstein |
| 6,373,992 B1 | 4/2002 | Nagao |
| 6,441,918 B1 | 8/2002 | Hori |
| 6,459,699 B1 | 10/2002 | Kimura et al. |
| 6,496,221 B1 | 12/2002 | Wolf et al. |
| 6,559,849 B1 | 5/2003 | Anderson et al. |
| 6,587,509 B1 | 7/2003 | Suzuki et al. |
| 6,650,327 B1 | 11/2003 | Airey et al. |
| 6,665,369 B2 | 12/2003 | Ukita |
| 6,667,815 B1 | 12/2003 | Nagao |
| 6,724,942 B1 | 4/2004 | Arai |
| 6,728,317 B1 | 4/2004 | Demos |
| 6,744,928 B1 | 6/2004 | Juri et al. |
| 6,839,152 B2 | 1/2005 | Fan et al. |
| 6,868,190 B1 | 3/2005 | Morton |
| 6,963,668 B2 | 11/2005 | Engeldrum et al. |
| 6,987,586 B2 | 1/2006 | Bogdanowicz |
| 6,990,251 B2 | 1/2006 | Edgar |
| 6,990,252 B2 | 1/2006 | Shekter |
| 6,995,793 B1 | 2/2006 | Albadawi et al. |
| 7,065,255 B2 | 6/2006 | Chen et al. |
| 7,092,016 B2 | 8/2006 | Morton et al. |
| 7,106,907 B2 | 9/2006 | Lin et al. |
| 7,149,247 B2 * | 12/2006 | Sullivan ............ H04N 21/8455 375/240.01 |
| 7,239,359 B2 | 7/2007 | Matsuyama |
| 7,245,783 B2 | 7/2007 | Fielding |
| 7,362,911 B1 | 4/2008 | Frank |
| 7,596,239 B2 | 9/2009 | Winger et al. |
| 7,630,005 B2 | 12/2009 | Takei |
| 7,653,132 B2 | 1/2010 | Dang |
| 7,664,337 B2 | 2/2010 | Balram et al. |
| 7,680,356 B2 | 3/2010 | Boyce et al. |
| 7,738,722 B2 | 6/2010 | Gomila et al. |
| 7,742,655 B2 | 6/2010 | Gomila et al. |
| 7,856,055 B2 | 12/2010 | Zhou et al. |
| 7,889,939 B2 | 2/2011 | Llach et al. |
| 7,958,532 B2 | 6/2011 | Paul et al. |
| 2001/0056568 A1 | 12/2001 | Hirotsu et al. |
| 2002/0003903 A1 | 1/2002 | Engeldrum et al. |
| 2002/0016103 A1 | 2/2002 | Behnke |
| 2002/0034337 A1 | 3/2002 | Shekter |
| 2002/0106103 A1 | 8/2002 | Jones et al. |
| 2002/0133764 A1 | 9/2002 | Wang |
| 2002/0154140 A1 | 10/2002 | Tazaki |
| 2002/0171649 A1 | 11/2002 | Fogg |
| 2003/0011615 A1 | 1/2003 | Tidwell |
| 2003/0031128 A1 | 2/2003 | Kim et al. |
| 2003/0043922 A1 | 3/2003 | Kalker et al. |
| 2003/0063778 A1 | 4/2003 | Rowe et al. |
| 2003/0068097 A1 | 4/2003 | Wilson et al. |
| 2003/0086623 A1 | 5/2003 | Berkner et al. |
| 2003/0101453 A1 | 5/2003 | Matsuyama et al. |
| 2003/0206231 A1 | 11/2003 | Chen et al. |
| 2003/0206662 A1 | 11/2003 | Avinash et al. |
| 2003/0218610 A1 | 11/2003 | Mech et al. |
| 2004/0006575 A1 | 1/2004 | Visharam et al. |
| 2004/0013308 A1 | 1/2004 | Jeon et al. |
| 2004/0071363 A1 | 4/2004 | Kouri et al. |
| 2004/0073926 A1 | 4/2004 | Nakamura et al. |
| 2004/0101059 A1 | 5/2004 | Joch et al. |
| 2004/0208389 A1 | 10/2004 | Lin |
| 2004/0264795 A1 | 12/2004 | Fielding |
| 2006/0007460 A1 | 1/2006 | Bogdanowicz et al. |
| 2006/0013320 A1 | 1/2006 | Oguz et al. |
| 2006/0072660 A1 | 4/2006 | Jia et al. |
| 2006/0082649 A1 | 4/2006 | Gomila et al. |
| 2006/0083316 A1 | 4/2006 | Cooper et al. |
| 2006/0083426 A1 | 4/2006 | Cooper et al. |
| 2006/0083429 A1 | 4/2006 | Joly |
| 2006/0104366 A1 | 5/2006 | Huang et al. |
| 2006/0133686 A1 | 6/2006 | Gomila et al. |
| 2006/0182183 A1 | 8/2006 | Winger |
| 2006/0183275 A1 | 8/2006 | Schoner et al. |
| 2006/0256853 A1 | 11/2006 | Schlockermann et al. |
| 2006/0256871 A1 | 11/2006 | Boyce et al. |
| 2006/0291557 A1 | 12/2006 | Tourapis |
| 2007/0002947 A1 | 1/2007 | Lu et al. |
| 2007/0030996 A1 | 2/2007 | Winger et al. |
| 2007/0036452 A1 | 2/2007 | Llach et al. |
| 2007/0047658 A1 | 3/2007 | Tourapis et al. |
| 2007/0058866 A1 | 3/2007 | Boyce et al. |
| 2007/0058878 A1 | 3/2007 | Gomila et al. |
| 2007/0070241 A1 | 3/2007 | Boyce et al. |
| 2007/0104380 A1 | 5/2007 | Gomila et al. |
| 2007/0117291 A1 | 5/2007 | Cooper et al. |
| 2007/0140588 A1 | 6/2007 | Balram et al. |
| 2007/0297515 A1 | 12/2007 | Gomila et al. |
| 2008/0025781 A1 | 1/2008 | Koyama |
| 2008/0152250 A1 | 6/2008 | Gomila et al. |

(56) References Cited

U.S. PATENT DOCUMENTS

| | | |
|---|---|---|
| 2008/0252781 A1 | 10/2008 | De Waele et al. |
| 2010/0104025 A1 | 4/2010 | Rose et al. |

FOREIGN PATENT DOCUMENTS

| | | |
|---|---|---|
| EP | 575006 | 6/1993 |
| EP | 0622000 | 11/1994 |
| EP | 0756281 | 1/1997 |
| EP | 1175091 | 1/2002 |
| EP | 1215624 | 6/2002 |
| EP | 800313 | 11/2003 |
| EP | 1511320 | 3/2005 |
| EP | 1812940 | 10/2005 |
| EP | 1611740 | 1/2006 |
| EP | 1661089 | 5/2006 |
| EP | 1690423 | 8/2006 |
| GB | 2312124 | 10/1997 |
| JP | 1156069 | 6/1989 |
| JP | 3187661 | 8/1991 |
| JP | 497681 | 3/1992 |
| JP | 4097681 | 3/1992 |
| JP | 04349458 | 12/1992 |
| JP | 5252459 | 9/1993 |
| JP | 879765 | 3/1996 |
| JP | 8079765 | 3/1996 |
| JP | 8149466 | 6/1996 |
| JP | 9062718 | 3/1997 |
| JP | 9139940 | 5/1997 |
| JP | 9247681 | 9/1997 |
| JP | 9275529 | 10/1997 |
| JP | 10509297 | 9/1998 |
| JP | 200041242 | 2/2000 |
| JP | 2001357090 | 12/2001 |
| JP | 2001357095 | 12/2001 |
| JP | 2002359845 | 12/2002 |
| JP | 2002374541 | 12/2002 |
| JP | 200324326 | 1/2003 |
| JP | 2003163853 | 6/2003 |
| JP | 2003179923 | 6/2003 |
| JP | 2004120057 | 4/2004 |
| JP | 2004135169 | 4/2004 |
| JP | 2007507172 | 3/2007 |
| JP | 2007529945 | 10/2007 |
| RU | 2073913 | 2/1997 |
| RU | 2088962 | 8/1997 |
| RU | 2139637 | 10/1999 |
| WO | WO8907799 | 8/1989 |
| WO | WO9206409 | 4/1992 |
| WO | WO9314591 | 7/1993 |
| WO | WO9404960 | 3/1994 |
| WO | WO9520292 | 7/1995 |
| WO | WO9710676 | 3/1997 |
| WO | WO9722204 | 6/1997 |
| WO | WO9729632 | 8/1997 |
| WO | WO0018109 | 3/2000 |
| WO | WO0146992 | 6/2001 |
| WO | WO0174064 | 10/2001 |
| WO | WO0177871 | 10/2001 |
| WO | WO0233958 | 4/2002 |
| WO | WO0251160 | 6/2002 |
| WO | WO03005731 | 1/2003 |
| WO | WO2004095829 | 11/2004 |
| WO | WO2004104931 | 12/2004 |
| WO | WO2004105250 | 12/2004 |
| WO | WO2005027045 | 3/2005 |
| WO | WO2005032143 | 4/2005 |
| WO | WO2005034518 | 4/2005 |
| WO | WO2005039188 | 4/2005 |
| WO | WO2005039189 | 4/2005 |
| WO | WO2006022705 | 3/2006 |
| WO | WO2006057703 | 6/2006 |

OTHER PUBLICATIONS

Bjontegaard: "Addition of Comfort Noise as Post Processing", ITU-Telecommunications Standardizations Sector, 2nd Meeting, Sunriver: Oregon, Sep. 8-11, 1997.

Byun et al: "Power Efficient MPEG-4 Decoder Architecture Featuring Low-complexity Error Resilience"; Proceedings IEEE Asia-Pac Conference 2002, pp. 225-228.

Conklin et al: "Filter for Inloop Deblocking"; Joint Video Team; 5th Meeting, Fairfax, Virginia; May 6-10, 2002.

McMahon et al: "High Quality SD & HD AVC Test Results"; Joint Video Team, 5th Meeting, Geneva, Switzerland, Oct. 9-17, 2002.

Naderi et al: "Estimation of Images Degraded by Film-Grain Noise"; Abstract. Applied Optics, vol. 17, Issue 8, pp. 1228-1237. 1978.

Pirsch et al: "VLSI Architectures for Video Compression"; IEEE Symposium on Signals, Systems and Electronics; Feb. 1995, vol. 83, Issue 2, pp. 220-246.

Schlockerman et al: "Film Grain Coding in H.264/AVC"; Joint Video Team; 9th Meeting, San Diego, California, Sep. 2-5, 2003.

Sullivan et al: "The H.264/AVC Advanced Video Coding Standard: Overview & Introduction to the Fidelity Range Extensions": Proceedings of SPIE, vol. 5558, Bellingham, Washington, 2004.

List, et al., Adaptive Deblocking Filter, IEEE Transactions on Circuits and Systems for Video Technology, vol. 13, No. 7, Jul. 2003.

Campisi et al., Signal-Dependent Film Grain Noise Generation Using Homomorphic Adaptive Filtering, IEE Proc.-Vis. Image Signal Process, vol. 147, No. 3, Jun. 2000.

Gomila, et al., SEI Message for Film Gain Encoding, Joint Video Team (JVT) of ISO/IEC MPEG & ITU-T VCEG (ISO/IEC JTC1/SV29/WG11 and ITU-T SG16 Q.6), 8th meeting: Geneva, CH, May 23-27, 2003.

Gomila, SEI Message for Film Grain Encoding: Syntax and Results, Joint Video Team (JVT) of ISO/IEC MPEG & ITU-T VCEG (ISO/IEC JTC1/SC29/WG11 and ITU-T SG16 Q.6) 7th Meeting: San Diego, California, USA, Sep. 2-5, 2003.

Wenger et al., "RTP Payload Format for H.264 Video", IETF Standard-Working-Draft, Internet Engineering Task Force, IETF, vol. AVT, No. 11, Aug. 2004, CH.

Tourapis et al., "Quantization Offset Matrices for Fidelity Range Extensions", JVT of ISO/IEC MPEG&ITU-T VCEG, Document: JVT-L032, 12th Meeting: Redmond, Washington, Jul. 19-23, 2004.

Peng et al., "Adaptive Frequency Weighting for Fine-Granualarity-Scalability", Visual Communications and Image Processing 2002, Proceedings of SPIE, vol. 4671, 2002.

Oktem et al., "Transform Domain Algorithm for Reducing Effect of Film-Grain Noise in Image Compression", Electronics Letters, vol. 35, No. 21, Oct. 14, 1999.

Al-Shaykh et al., "Restoration of Lossy Compressed Noisy Images", IEEE Transactions on Image Processing, vol. 3, No. 10, Oct. 1999.

Shahnaz et al., "Image Compression in Signal-Dependent Noise", Applied Optics, vol. 38, No. 26, Sep. 10, 1999.

Zhao et al., Constant Quality Rate Control for Streaming MPEG-4 FGS Video, IEEE, 2002.

Al-Shaykh et al., "Lossy Compression of Noisy Images", IEEE Transactions on Image Processing, vol. 7, No. 12, Dec. 1998.

Brightwell et al., "Automated Correction of Film Unsteadiness, Dirt and Grain", International Broadcasting Convention, Sep. 16-20, 1994.

Fischer et al., "Image Sharpening Using Permutation Weighted Medians", National Science Foundation, Mar. 12, 2018.

Yan et al., "Signal-Dependent Film Grain Noise Removal and Generation Based on Higher-Order Statistics", Ontario, Canada, IEEE, 1997.

Chavel et al., "Film Grain Noise in Partially Coherent Imaging", Optical Engineering, vol. 19, No. 3, May/Jun. 1980.

McLean et al., "Telecine Noise Reduction", The Institution of Electrical Engineers, London, UK, Jan. 16, 2001, pp. 1-6.

(56) References Cited

OTHER PUBLICATIONS

Al-Shaykh et al, "Lossy Compression of Images Corrupted by Film Grain Noise", IEEE, Atlanta, GA, 1996.
Prades-Nebot, "Rate control for Fully Fine-Grained Scalable Video Coders", Visual Communications and Image Processing 2002, Proceedings of SPIE, vol. 4671, 2002.
Van Der Schaar, "Fine-Granualarity-Scalability for Wireless Video and Scalable Storage", Visual Communications and Image Processing 2002, Proceedings of SPIE, vol. 4671, 2002.
Yan et al., "Efficient Video Coding with Hybrid Spatial and Fine-Grain SNR Scalabilities", Visual Communications and Image Processing 2002, Proceedings of SPIE, vol. 4671, 2002.
Yan et al., "Film Grain Noise Removal and Generation for Color Images", Proceedings of the 1998 IEEE International Conference on Acoustics, Speech and Signal Processing, May 15, 1998.
Zhang et al., "Constant Quality Constrained Rate Allocation for FGS Video Coded Bitstreams", Visual Communications and Image Processing 2002, Proceedings of SPIE, vol. 4671, 2002.
Yoshida, "Go With the Grain, Film R&D Chief Urges, for Art's Sake", EE Times, Feb. 7, 2005.
Chen, "Transporting Compresssed Digital Video, Chapter 5: Time Stamping for Decoding and Presentation", Dordrecht, London, 2002, pp. 133-136.
Puri et al., "Video Coding Using the H.264/MPEG-4 AVC Compression Standard", Signal Processing: Image Communication 19, 2004, pp. 793-849.
Gomila et al., "Film Grain Modeling vs. Encoding", JVT of ISO/IEC MPEG & ITU-T VCEG, Document: JVT-K036, 11th Meeting: Munich, DE, Mar. 15-19, 2004.
Gomila et al., "Simplification of th eJVT deblocking filter" Joint Video Team (JVT) of ISO/IEC MPEG & ITU-T VCEG (ISO/IEC JTC1/SC29/WG11 and ITU-T SG16 Q.6)3rd Meeting: Fairfax, Virginia, USA, May 6-10, 2002.

\* cited by examiner

FIG. 1
FGM Processing Chain

FIG. 2
Creation of a NxN Block of Film Grain Based on Pre-computed Transformed Coefficients FIG. 4
Film Grain Pattern Creation Using a Small Database of Pre-computed DCT Coefficients of Several Images of Gaussian Noise

FILM GRAIN SIMULATION BASED ON PRE-COMPUTED TRANSFORM COEFFICIENTS

CROSS-REFERENCE TO RELATED APPLICATIONS

This application is a continuation of U.S. application Ser. No. 11/667,581, filed May 10, 2007.

This application claims priority under 35 U.S.C. 119(e) to U.S. Provisional Patent Application Ser. No 60/630,640, filed Nov. 23, 2004, the teachings of which are incorporated herein.

TECHNICAL FIELD

This invention relates to a technique for simulating film grain in an image.

BACKGROUND OF THE INVENTION

Motion picture films comprise silver-halide crystals dispersed in an emulsion, coated in thin layers on a film base. The exposure and development of these crystals form the photographic image consisting of discrete tiny particles of silver. In color negatives, the silver undergoes chemical removal after development and tiny blobs of dye occur on the sites where the silver crystals form. These small specks of dye are commonly called 'grain' in color film. Grain appears randomly distributed on the resulting image because of the random formation of silver crystals on the original emulsion. Within a uniformly exposed area, some crystals develop after exposure while others do not.

Grain varies in size and shape. The faster the film, the larger the clumps of silver formed and blobs of dye generated, and the more they tend to group together in random patterns. The grain pattern is typically known as 'granularity'. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and high-definition images, whereas film grain progressively loses importance in SDTV and becomes imperceptible in smaller formats.

Motion picture film typically contains image-dependent noise resulting either from the physical process of exposure and development of the photographic film or from the subsequent editing of the images. The photographic film possesses a characteristic quasi-random pattern, or texture, resulting from physical granularity of the photographic emulsion. Alternatively, a similar pattern can be simulated over computed-generated images in order to blend them with photographic film. In both cases, this image-dependent noise is referred to as grain. Quite often, moderate grain texture presents a desirable feature in motion pictures. In some instances, the film grain provides visual cues that facilitate the correct perception of two-dimensional pictures. Film grain is often varied within a single film to provide various clues as to time reference, point of view, etc. Many other technical and artistic uses exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into a natural scene. Cineon® from Eastman Kodak Co, Rochester N.Y., one of the first digital film applications to implement grain simulation, produces very realistic results for many grain types. However, the Cineon® application does not yield good performance for many high-speed films because of the noticeable diagonal stripes the application produces for high grain size settings. Further, the Cineon® application fails to simulate grain with adequate fidelity when images are subject to previous processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

None of these past schemes solves the problem of restoring film grain in compressed video. Film grain constitutes a high frequency quasi-random phenomenon that typically cannot undergo compression using conventional spatial and temporal methods that take advantage of redundancies in the video sequences. Attempts to process film-originated images using MPEG-2 or ITU-T/ISO H.264 compression techniques usually result either in an unacceptably low degree of compression or complete loss of the grain texture.

Thus, there exists a need for a technique simulating film grain, especially a technique that affords relatively low complexity.

BRIEF SUMMARY OF THE INVENTION

Briefly, in accordance with the present principles, there is provided a method for simulating a block of film grain. The method begins by obtaining a pre-computed block of transformed coefficients. The block of pre-computed block of transformed coefficients then undergoes filtering responsive to a frequency range that characterize a desired pattern of the film grain. (In practice, the frequency range lies within a set of cut frequencies $f_{HL}$, $f_{VL}$, $f_{HH}$ and $f_{VH}$ of a filter, in two dimensions, that characterizes a desired film grain pattern.) Thereafter, the filtered set of coefficients undergoes an inverse transform to yield the film grain pattern.

DETAILED DESCRIPTION OF THE DRAWINGS

DETAILED DESCRIPTION

Figure 1:
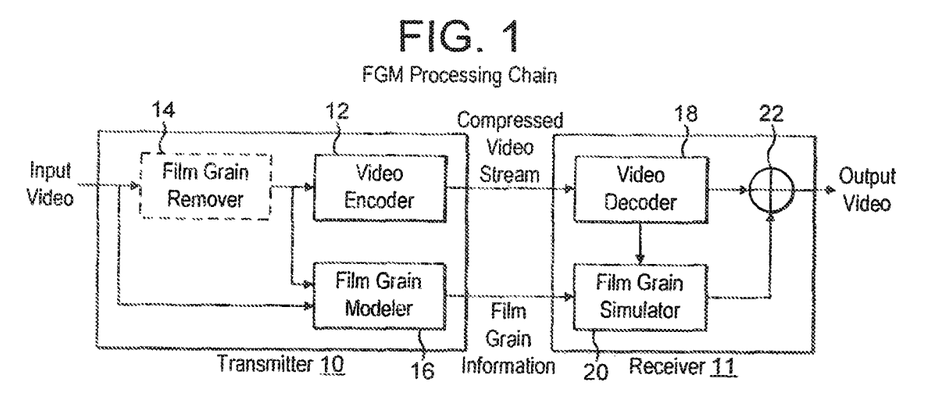
FIG. 1 depicts a block schematic diagram of the combination of a transmitter and receiver in a film grain processing chain useful for practicing the technique of the present principles.

To understand the technique of the present principles for simulating film grain using a set of pre-computed transformed coefficients, a brief overview of film grain simulation will prove helpful. FIG. 1 depicts a block schematic diagram of a transmitter 10, which receives an input video signal and, in turn, generates a compressed video stream at its output. In addition, the transmitter 10 also generates information indicative of the film grain (if any) present in the sample. In practice, the transmitter 10 could comprises part of a head-end array of a cable television system, or other such system that distributes compressed video to one or more downstream receivers 11, only one of which is shown in FIG. 1. The transmitter 10 could also take the form of encoder that presents media like DVDs. The receiver 11 decodes the coded video stream and simulates film grain in accordance with the film grain information and decoded video, both received from the transmitter 10 or directly from the media itself in the case of a DVD or the like, to yield an output video stream that has simulated film grain. The receiver 11 can take the form of a set-top box or other such mechanism that serves to decode compressed video and simulate film grain in that video.

The overall management of film grain requires the transmitter 10 (i.e., the encoder) provide information with respect to the film grain in the incoming video. In other words, the transmitter 10 "models" the film grain. Further the receiver 11 (i.e., decoder) simulates the film grain according to the film grain information received from the transmitter 10. The transmitter 10 enhances the quality of the compressed video by enabling the receiver 11 to simulate film grain in the video signal when difficulty exists in retaining the film grain during the video coding process.

In the illustrated embodiment of FIG. 1, the transmitter 10 includes a video encoder 12 which encodes the video stream using any of the well known video compression techniques such as the ITU-T Rec. H.264|ISO/IEC 14496-10 video compression standard. Optionally, a film grain remover 14, in the form of a filter or the like depicted in dashed lines in FIG. 1, could exist upstream of the encoder 12 to remove any film grain in the incoming video stream prior to encoding. To the extent that the incoming video contains no film grain, no need would exist for the film grain remover 14.

A film grain modeler 16 accepts the input video stream, as well as the output signal of the film grain remover 14 (when present). Using such input information, the film grain modeler 16 establishes the film grain in the incoming video signal. In its simplest form, the film grain modeler 16 could comprise a look up table containing film grain models for different film stocks. Information in the incoming video signal would specify the particular film stock originally used to record the image prior to conversion into a video signal, thus allowing the film grain modeler 16 to select the appropriate film grain model for such film stock. Alternatively, the film grain modeler 16 could comprise a processor or dedicated logic circuit that would execute one or more algorithms to sample the incoming video and determine the film grain pattern that is present.

The receiver 11 typically includes a video decoder 18 that serves to decode the compressed video stream received from the transmitter 10. The structure of the decoder 18 will depend on the type of compression performed by the encoder 12 within the transmitter 10. Thus, for example, the use within the transmitter 10 of an encoder 12 that employs the ITU-T Rec. H.264|ISO/IEC 14496-10 video compression standard to compress outgoing video will dictate the need for an H.264-compliant decoder 18. Within the receiver 11, a film grain simulator 20 receives the film grain information from the film grain model 16. The film grain simulator 20 can take the form of a programmed processor, or dedicated logic circuit having the capability of simulating film grain for combination via a combiner 22 with the decoded video stream.

Film grain simulation aims to synthesize film grain samples that simulate the look of the original film content. As described, film grain modeling occurs at the transmitter 10 of FIG. 1, whereas film grain simulation occurs at the receiver 11. In particular, film grain simulation occurs in the receiver 11 along with the decoding the incoming video stream from the transmitter 10 upstream of the output of the decoded video stream. Note that the decoding process that occurs in the receiver 11 makes no use of images with added film grain. Rather, film grain simulation constitutes a post-processing method for synthesizing simulated film grain in the decoded images for display. For that reason, the ITU-T Rec. H.264|ISO/IEC 14496-10 video compression standard contains no specifications regarding the film grain simulation process. However, film grain simulation requires information concerning the grain pattern in the incoming video signal, which information typically undergoes transmission in a film grain characteristics Supplemental Enhancement Information (SEI) message when using the ITU-T Rec H.264|ISO/IEC 14496-10 video compression standard as specified by the Amendment 1 (Fidelity Range Extensions) of that compression standard.

Film grain simulation in accordance with the present principles makes use of a pre-computed set of transformed coefficients. In other words, the simulation process begins with a block, typically, although not necessarily, of N×N size, whose coefficients have been transformed in advance of simulation, typically, but not necessarily, using a Discrete Cosine Transformation. Other transformations are possible. Bit-accurate implementation of the simulation method of the present principles occurs by performing an integer inverse transform on the block of pre-computed values.

The film grain simulation method of the present principles presents an interesting tradeoff between complexity and memory requirements when compared to previously disclosed methods. On the one hand, the present method reduces the complexity of the transform-based approaches, by avoiding computation of the direct transform. On the other hand, the method reduces the memory requirements of database-based approaches by storing transformed coefficients instead of film grain patterns. The proposed method could be applied to HD DVD systems, BD ROM systems as well as satellite broadcasting just to cite a few examples.

Figure 2:
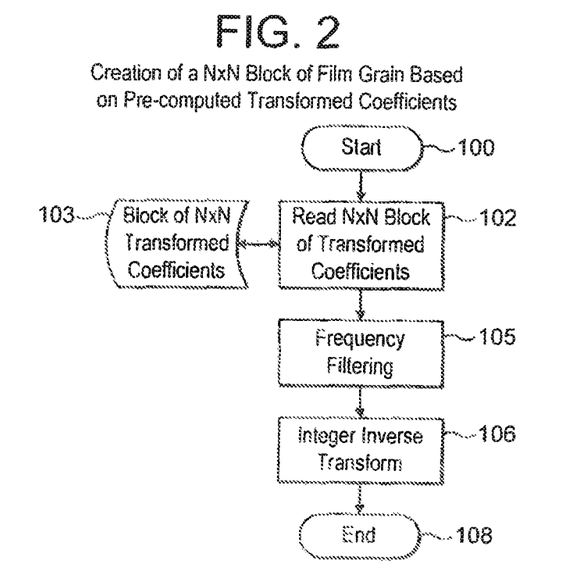
FIG. 2 depicts, in flow chart form, the steps of a first method for creating a block of film grain using pre-computed coefficients.

FIG. 2 illustrates in flow-chart form, the steps of the method of the present principles, for simulating film grain using pre-computed coefficients. The method of FIG. 2 commences upon execution of the start step 100 during which initialization typically happens, although such initialization need not necessarily to occur. Thereafter, step 102 occurs during which a block of pre-computed transformed coefficients, typically, although not necessarily, N×N in size, is read from a memory 103. Many techniques exist for creating the set of pre-computed coefficients in the memory 103 of FIG. 2. For example, the transformed coefficients could be pre-computed using a Discrete Cosine Transformation (DCT) on a set of random values, as described in detail with respect to FIGS. 3 and 4. Other techniques exist for computing a set of transformed coefficients in advance of film grain simulation. The transformed coefficients then undergo frequency filtering during step 105 using a pre-defined set of cut frequencies $f_{HL}$, $f_{VL}$, $f_{HH}$ and $f_{VH}$ that represent cut-off frequencies (in two dimensions) of a filter that characterizes the desired film grain pattern. During step 106, the frequency filtered block of transformed coefficients undergoes an inverse transformation, typically, although not necessarily, an Inverse Discrete Cosine Transformation (IDCT), to yield a block of film grain, before the process ends with step 108. Under some circumstances, scaling of the inversely transformed block of coefficient following step 106 will prove useful prior to ending of the process.

Figure 3:
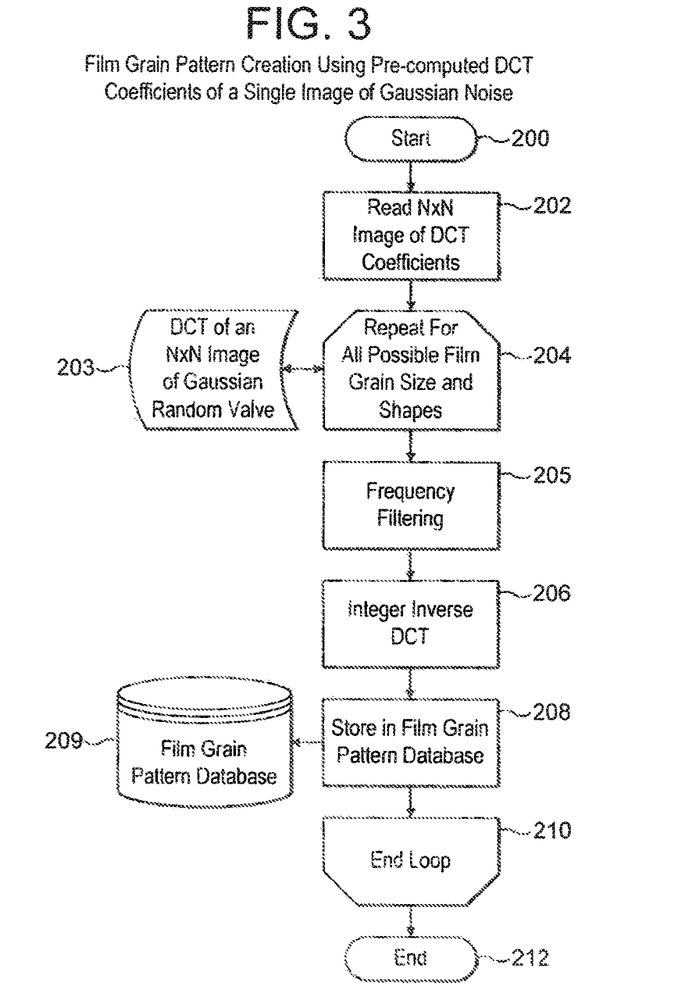
FIG. 3 depicts, in flow chart form, the steps of a method for film grain pattern creation using pre-computed Discrete Cosine Transformation (DCT) coefficients of a single image of Gaussian Noise.

FIG. 3 illustrates in flow chart form a method for film grain pattern simulation using pre-computed DCT coefficients of a single image of Gaussian random noise. The method of FIG. 3 commences upon execution of the start step 300 during which initialization occurs, although such initialization need not necessarily happen. Thereafter, step 202 occurs during which a block of pre-computed transformed coefficients, typically, although not necessarily N×N in size, is read from a memory 203. The block of coefficients read from the memory 203 during step 202 typically has been created by applying a DCT transform to an N×N image of Gaussian random values.

Following step 202, step 204 occurs, initiating entry into a loop that repeats for all possible film grain sizes and shapes. Upon entry into the loop, the transformed coefficients undergo frequency filtering during step 205 using a predefined set of cut frequencies $f_{HL}$, $f_{VL}$, $f_{HH}$ and $f_{VH}$ that represent cut-off frequencies (in two dimensions) of a filter that characterizes the desired film grain pattern. Next step 206 occurs during which the frequency filtered block of transformed coefficients undergoes an inverse transformation, typically, although not necessarily, an Inverse Discrete Cosine Transformation (IDCT), to yield a block of film grain. Under some circumstances, scaling of the inversely transformed block of coefficients following or preceding step 206 will prove useful.

Thereafter, the block of film grain that results from the inverse transformation performed during step 206 (or after scaling if such scaling occurs) undergoes storage in a database 209 during step 208. The loop initiated during step 204 undergoes repeating (i.e., steps 205 and 206 are repeated) for all possible film grain sizes and shapes, whereupon loop execution ends during step 210, after which the method ends during step 212. As can be appreciated from the foregoing description, the single image of Gaussian random values read from the memory 203 during step 202 of FIG. 3 serves as the kernel for each of the film grain patterns stored in the database 210.

Figure 4:
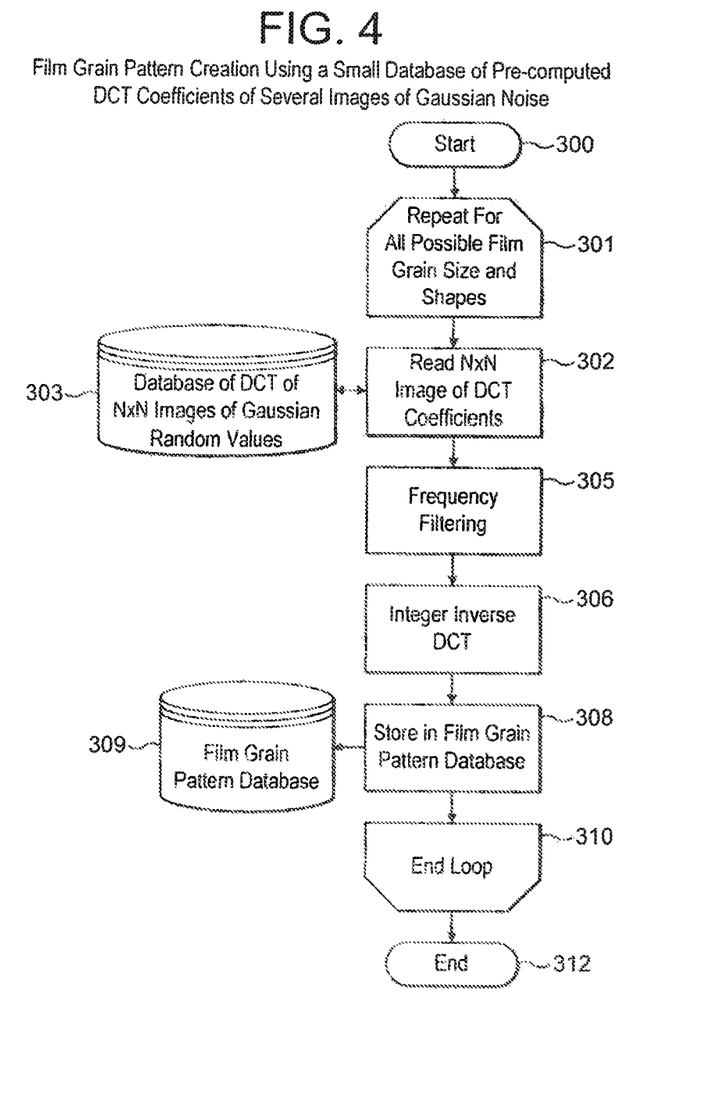
FIG. 4 depicts, in flow chart form, the steps of a method for film grain pattern creation using pre-computed Discrete Cosine Transformation (DCT) coefficients of several images of Gaussian Noise.

FIG. 4 illustrates in flow chart form a method for film grain pattern simulation using pre-computed DCT coefficients of multiple images of Gaussian random noise. The method of FIG. 4 commences upon execution of the start step 300 during which initialization occurs, although such initialization need not necessarily happen. Next step 301 occurs, initiating entry into a loop that repeats for all possible film grain size and shape. Upon entry into the loop, step 302 occurs and a block of pre-computed transformed coefficients, typically, although not necessarily, N×N in size, is read from a memory 303. The block of coefficients read from the memory 303 during step 302 typically comprises a database of DCT transforms of N×N images of Gaussian random values.

Following step 302, step 305 occurs and the N×N image of DCT coefficients read from the memory 303 undergoes frequency filtering using a predefined set of cut frequencies $f_{HL}$, $f_{VL}$, $f_{HH}$ and $f_{VH}$ that represent cut-off frequencies (in two dimensions) of a filter that characterizes the desired film grain pattern. Next step 306 occurs during which the frequency filtered block of transformed coefficients undergoes an inverse transformation, typically, although not necessarily, an Inverse Discrete Cosine Transformation (IDCT), to yield a block of film grain. Under some circumstances, scaling of the inversely transformed block of coefficients following step 306 will prove useful.

Thereafter, step 308 occurs and the block of film grain that results from the inverse transformation performed (and scaling if performed) undergoes storage in a database 309 during step 308.

The loop initiated during step 301 undergoes repeating (i.e., steps 302-308 are repeated) for all possible film grain sizes and shapes, whereupon loop execution ends during step 310, after which the method ends during step 312. Unlike the method of FIG. 3 that makes use of a single DCT image of Gaussian random values for all possible film grain shapes and sizes, the method of FIG. 4 makes use of a separate DCT image for each different film grain shape and size. Both methods allow creating a database of film grain values upon system initialization or reset for storage in conventional memory such as an SRAM memory.

The foregoing describes a technique for simulating film grain using pre-computed transformed coefficients, thereby reducing complexity.

The invention claimed is:

1. A method for simulating film grain in a decoded video stream, comprising:
   receiving an encoded video stream;
   receiving film grain information indicative of a desired film grain pattern;
   decoding the encoded video stream;
   accessing a set of transformed coefficients from a memory;
   generating the film grain by frequency filtering the set of transformed coefficients responsive to a frequency range that characterizes the desired pattern of film grain for blending the film grain with the decoded video stream.

2. The method according to claim 1 wherein the film grain information is received in a Supplemental Enhancement Message.

3. A method, comprising:
   transmitting an encoded video stream to a decoder; and
   transmitting to the decoder film grain information indicative of a desired film grain pattern so the decoder can decode the encoded video and can generate film grain by accessing a set of transformed coefficients from a memory of the decoder and frequency filtering the set of transformed coefficients responsive to a frequency range that characterizes the desired pattern of the film grain to combine the film grain with the decoded video stream.

4. The method according to claim 3 wherein the film grain information is transmitted in a Supplemental Enhancement Message.

5. Apparatus comprising:
   a transmitter configured to (a) encode input video and transmit such encoded video; and (b) model film grain present in the input video to generate and transmit film grain information indicative of a desired film grain pattern, whereby the film grain is generated by accessing a set of transformed coefficients from a memory and frequency filtering the set of transformed coefficients responsive to a frequency range that characterizes the desired film grain pattern.

6. The apparatus according to claim 5 wherein the film grain information is transmitted in a Supplemental Enhancement Message.

7. The apparatus according to claim 5 wherein the transmitter includes one of a processor or dedicated logic circuit.

8. The apparatus according to claim 5 wherein the transmitter comprises an encoder.

9. The apparatus according to claim 8 wherein the encoder encodes input video in accordance with the ITU-T Rec. H.264 | ISO/IEC 14496-10 video compression standard.

10. An apparatus for simulating film grain in a decoded video stream comprising:
   a decoder configured to (a) receive an encoded video stream; (b) receive film grain information indicative of a desired film grain pattern; (c) decode the encoded video stream; (d) access a set of transformed coefficients from a memory and generate the film grain by frequency filtering a set of transformed coefficients responsive to a frequency range that characterizes the desired pattern of film grain for blending the film grain with the decoded video stream.

* * * * *